Feb. 20, 1968     F. D. WOOD     3,370,115

METHOD OF MANUFACTURING A HOSE

Filed July 31, 1963

INVENTOR
Frank D. Wood
By Watson, Cole, Grindle & Watson 3,370,115
METHOD OF MANUFACTURING A HOSE
Frank Derek Wood, Bentham, near Lancaster, England, assignor to George Angus & Company Limited, Northumberland, England, a company of England
Filed July 31, 1963, Ser. No. 307,276
Claims priority, application Great Britain, Aug. 3, 1962, 30,033/62
6 Claims. (Cl. 264—94)

This invention provides an improved method of manufacturing a hose comprising a tubular textile jacket having an impermeable lining and an external coating. Such coating may serve the primary purpose of conferring abrasion resisting properties on the hose or it may serve as a water proofing coating.

The invention provides a method of manufacturing a hose constituted by a textile jacket having a thin impermeable lining and an external coating, which comprises introducing into the jacket a lining tube of rubber or expandable plastic material having a surface layer which has the capacity for flowing more readily when subjected to pressure, or to pressure and heat, than the body of the tube, and subjecting the hose, after introduction of the lining tube, to internal pressure and, if necessary, also to external heat to cause the surface layer only of the lining tube to exude through the interstices of the jacket to the exterior of the jacket.

The invention is primarily concerned with the manufacture of fire hose but is also applicable to the manufacture of hose which will become more or less rigid as the result of setting of the material exuded through the jacket after said exuded material has been worked to form a continuous external coating.

The surface layer of the lining tube normally exudes through the jacket as short spikes or columns which project from the exterior of the jacket. The external coating may be formed by applying pressure to these exudations, e.g. by rollers. As an alternative, however, the external coating may be formed by applying rubber or a plastic material to the spaces between the exudations, e.g. by drawing the hose through a bath of rubber latex or of a plastisol. The external coating so applied is firmly keyed to the jacket by the exuded portions of the lining tube. The bonding of the external coating is considerably firmer than that which is obtained when an external plastic coating is applied to a conventional jacket having no exuded material on its outer surface. Also when this latter method is adopted the external coating may be of a material different from that of the surface layer of the lining tube.

The lining tube may be introduced into the jacket during fabrication of the jacket, e.g. on a circular loom or on a braiding machine. Alternatively it may be drawn into a long length of fabricated jacket.

Normally heat as well as internal pressure will be applied to the lining tube to cause its surface layer to exude through the jacket. If, however, the surface layer of the lining tube is of a suitably catalysed silicone rubber, internal pressure alone will be sufficient to cause exudation of the silicone rubber through the jacket. After smoothing down, the exuded silicone rubber will cure in course of time.

The lining tube will normally have an outer surface layer which will flow more readily under given conditions of pressure and temperature than the body of the tube. The surface layer and the body of the lining tube may be of different materials or of the same material in different states.

When heat is used to secure exudation of the surface layer of the lining tube, this heat is not always sufficient to ensure a strong bond between the lining tube and the jacket. Further heat may be necessary after the exuded portions of the surface layer have been smoothed to ensure complete vulcanization or polymerization of the surface layer and effective bonding of the lining tube to the jacket.

If identical materials are used for the body of the lining tube and outer surface layer the required difference in flow characteristics can be achieved by wholly or partly crosslinking or polymerising the lining tube and thereafter applying to it a surface layer of the same material in a less cross linked or polymerized state. After introduction of the lining tube and surface layer into the jacket internal pressure is applied to the inside of the lining and heat may be applied to the outside of the jacket as necessary to cause the surface layer to exude through the interstices of the jacket. The material which has been exuded through the jacket may then be smoothed down to form an outer coating (heat being applied to soften the material if necessary) and then cross-linking or polymerization and bonding of the soft layer material to the jacket and the body of the lining tube may be accomplished by the application of heat.

In the case when the lining tube is of rubber or a thermosetting plastic, the lining tube and surface layer may be separate tubes inserted one within the other. Alternatively the surface layer may be formed from calendered sheet wrapped around the lining tube. Alternatively the surface layer may be a suitable plastisol or rubber latex applied and dried on the tube. Alternatively the lining tube and surface layer may be integral. In the latter case the required difference in flow characteristics between the inside and the outside of the tube may be obtained by applying extra accelerators to the inside of the tube (which can be done, for example, during extrusion) and then heating if necessary so that the inside of the tube becomes more completely cured than its surface portion.

For thermoplastics the method is identical except that the lining tube and the outer surface layer must be made from two materials which have flow characteristics far enough apart for the surface layer but not the lining tube to be exuded at some particular combination of pressure and temperature.

It is a proven advantage to use a textile reinforcement in the lining of a fire hose as this delays the tendency of the lining to protrude through holes which may have been worn in the jacket. A reinforcement may be provided in the lining, in accordance with the invention, in the following ways:

(1) Textile yarns may be helically wrapped around the outer surface layer of the lining tube before the lining tube/surface layer tube assembly is drawn into the jacket.

(2) The surface layer may itself consist of a cloth on to which has been calendered the soft flowable material constituting the surface layer. This cloth may be a normal woven knitted or braided cloth, or it may consist substantially of only warp or of weft yarns as in the case of a tire fabric.

(3) A cloth as defined in (2) may be introduced either within the lining tube, between the lining tube and the surface layer tube or between the surface layer tube and the jacket.

The jacket is preferably woven, but it may be knitted or brailed or may consist of warp yarns with a wound helical weft which does not interlace with the warps. When the jacket is not a woven one, it is preferable to assemble the jacket and the lining tube on a metal mandrel from which the assembly is withdrawn prior to inflation of the lining tube.

Example 1

An inner lining tube was made by extrusion from the following compound:

| | Parts by weight |
|---|---|
| Butakon—AC–5502 | 100 |
| Sulphur | 0.5 |
| Zinc oxide | 5 |
| Antioxidant | 2 |
| Stearic acid | 1 |
| Carbon black | 30 |
| DIOS | 15 |
| PPA | 15 |
| TMT accelerator | 3 |

This tube was 0.030 inch thick and had a flat width of 1.9 inches.

This tube was then heated in a steam autoclave for 9 minutes at 40 p.s.i. steam pressure.

The lining tube weighed 0.058 lb./ft.

A surface layer tube of a size to fit comfortably over the inner tube was extruded from the following compound:

| | Parts by weight |
|---|---|
| Butakon—AC–5502 | 100 |
| Sulphur | 1 |
| Antioxidant | 1 |
| Colour | 1 |
| Zinc oxide | 5 |
| DIOS | 3 |
| DNP | 3 |
| Robec PTM accelerator | 0.6 |

This surface layer tube was 0.04 inch thick and had a flat width of 2.1 inches.

The surface layer tube had a weight of 0.086 lb/ft.

The lining tube was pulled inside the surface layer tube by passing a string down the inside of the surface layer tube by means of a manually operated shuttle and then pulling the lining tube into the surface layer tube by means of the string. The assembled tubes were then pulled in the same manner into a textile jacket of the following construction:

Warp: 76 ends of 10 ply 250 denier Terylene (0.0165 lb. per foot);

Weft: 10 picks per inch of 5 ply 840 denier nylon (0.0157 lb. per foot);

Total weight per foot: 0.0322 lb. unsized; 0.035 lb. sized.

The jacket had an internal diameter of 1½" after sizing. It was sized with a P.V.C./nitrile latex to prevent movement of the yarns during handling.

An internal air pressure of 50 p.s.i. was then applied to the lining tube so that the surface layer tube was tightly squeezed between the lining tube and the jacket.

A travelling hot air oven 3 ft. long was then arranged to travel along the hose, the oven carrying at its trailing end three pairs of rollers, at 60° to each other.

The oven was arranged to travel at 0.5 ft. per minute with an air temperature at 160° C. The air velocity in the oven was approximately 2000 ft./minute, and at this speed exudation of the surface layer occurred satisfactorily and the rollers at the end of oven smoothed down the exudations to form a smooth outer coating.

On completion the finished fire hose had an external diameter of 1.65 inches, and an internal diameter of 1.5 inches.

The method carried out in this example is illustrated in the accompanying diagrammatic drawings, in which.

Figure 1:
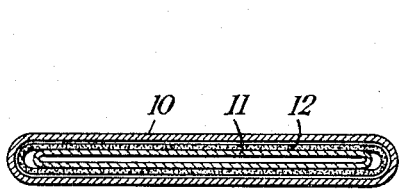
FIG. 1 shows the assemblage of tubes and jacket.
Figure 2:
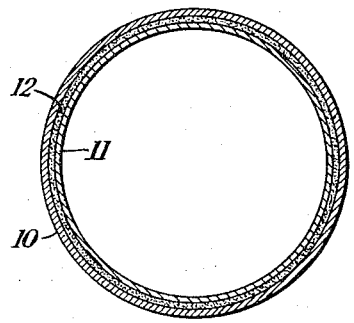
FIG. 2 shows the assemblage after inflation.
Figure 3:
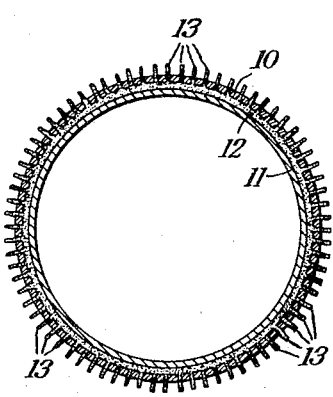
FIG. 3 shows the assemblage after heating from the exterior.
Figure 4:
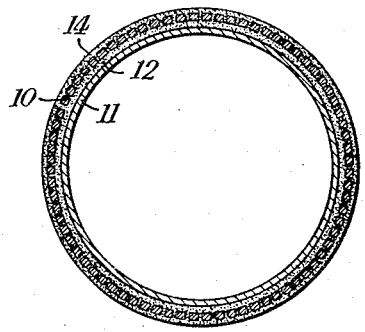
FIG. 4 shows the assemblage after smoothing.

In FIG. 1, the jacket is shown at 10, the inner lining tube at 11 and the surface layer tube at 12. The extruded "spikes" of lining material are shown at 13 in FIG. 3. FIG. 4 shows these spikes smoothed down to form an external coating 14.

Figure 5:
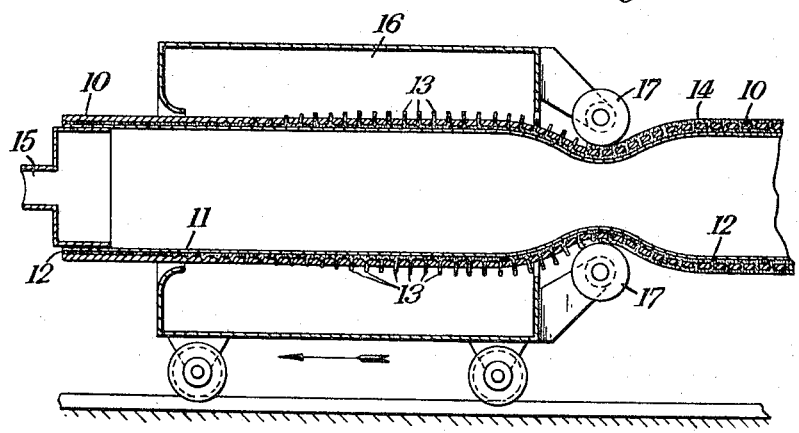
FIG. 5 shows the apparatus employed.

FIG. 5 shows the hose inflated by air pressure introduced through an inlet 15. The hose is provided with end supports not shown. The travelling air oven is shown at 16 and one of the pairs of trailing smoothing rollers carried by the air oven is shown at 17. It will be understood that this pair of rollers is closely followed by two other pairs inclined successively at 60° to each other.

Example 2—Jacket, as in Example 1.

| Lining tube: | Parts by weight |
|---|---|
| Natural rubber | 53.5 |
| Factice | 20.3 |
| Antioxidant | 1.2 |
| Stearic acid | 0.25 |
| Carbon black | 6.4 |
| Lithopone | 4.75 |
| Stockalite clay | 3.7 |
| Zinc oxide | 4.75 |
| Process oil | 3.65 |
| Sulphur | 0.75 |
| M.B.T. | 0.525 |
| Santocure | 0.195 |

The tube was then vulcanized in an autoclave for 20 minutes at 40 p.s.i. steam pressure.

| Surface layer: | Parts by weight |
|---|---|
| Smoked sheet rubber | 100.0 |
| Stearic acid | 0.83 |
| Antioxidant | 0.83 |
| M.B.T. | 0.73 |
| T.M.T. | 0.104 |
| Zinc oxide | 20.0 |
| China clay | 24.2 |
| Stockalite clay | 20.0 |
| Whiting | 20.0 |
| Sulphur | 2.92 |

A satisfactory hose was obtained with an oven temperature of 170° C., an air velocity in the oven of 2000 ft./minute, a traveling speed of the oven of 0.75 ft./minute, and an air pressure inside the hose of 40 p.s.i.

Example 3.—Jacket, as in Example 1; Lining tube, as in Example 1

Surface layer—A plasticised P.V.C. extrusion grade:

| | Parts by weight |
|---|---|
| P.V.C. polymer Geon 113 | 100 |
| Plasticiser, D.O.P. | 50 |
| Silica filler | 30 |
| Lubricant, calcium stearate | 1 |
| Cereclor 42 | 25 |
| White lead stabiliser | 7 |

A satisfactory hose was obtained with an oven air temperature of 170° C., an air velocity in the oven of 2,000 ft./minute, a travelling speed of the oven of 0.3 ft./minute and an air pressure inside the hose of 40 p.s.i.

As an alternative to using a travelling oven the oven may be fixed and the inflated hose passed through the oven.

As an alternative to the use of internal air pressure with external heat to cause the surface layer of the lining tube to exude through the interstices of the jacket, this result can be accomplished by introducing a pressurised heating medium into the lining tube.

What I claim as my invention and desire to secure by Letters Patent is:

1. A method of manufacturing a hose, which comprises the steps of introducing into a tubular textile jacket a lining tube of expandable thermoplastic material, said lining tube comprising inner and outer layers, said outer layer having the capacity for flowing more readily when subjected to pressure and heat than the inner layer of said lining tube, applying heat and internal pressure to said lining tube after it has been introduced into the jacket and in the absence of external pressure to cause the more readily flowable outer layer thereof to exude through said jacket and project from the exterior of the jacket in short spikes while said less flowable inner layer adheres to but does not flow through said jacket, and thereafter applying mechanical pressure to said exuded spikes to agglomerate the spikes and from a continuous external coating on said jacket.

2. A method as claimed in claim 1, wherein the jacket is subjected to external heat during exudation of said spikes through the jacket.

3. A method as claimed in claim 1 wherein said inner layer of said lining tube is composed of natural rubber and said outer layer is composed of smoked sheet rubber.

4. A method as claimed in claim 1 wherein said outer layer of said lining tube is composed of polyvinyl chloride.

5. A method as claimed in claim 1 wherein said outer layer of said lining tube is composed of silicone rubber.

6. A method of manufacturing a hose, which comprises the steps of introducing into a tubular textile jacket a lining tube of expandable thermoplastic material, said lining tube comprising inner and outer layers, said outer layer having the capacity for flowing more readily when subjected to pressure and heat than the inner layer of said lining tube, applying heat and internal pressure to said lining tube after it has been introduced into the jacket and in the absence of external pressure to cause the more readily flowable outer layer thereof to exude through said jacket and project from the exterior of the jacket in short spikes, and thereafter applying a thermoplastic material to the exterior of the jacket around said exuded spikes whereby an external thermoplastic coating is formed on said jacket and is anchored to said spikes.

References Cited
UNITED STATES PATENTS

| | | | |
|---|---|---|---|
| 2,690,769 | 10/1954 | Brown | 156—306 X |
| 3,152,002 | 10/1964 | Wisotzky et al. | 117—21 |
| 2,341,130 | 2/1944 | Unsworth | 156—376 X |
| 2,611,721 | 9/1952 | Brees | 156—287 |
| 2,767,431 | 10/1956 | De Laubarede | 156—244 |
| 2,960,425 | 11/1960 | Sherman | 156—82 |
| 3,157,544 | 11/1964 | Lichtey | 156—285 X |
| 3,183,135 | 5/1965 | Berquist | 156—394 X |

EARL M. BERGERT, *Primary Examiner.*

H. F. EPSTEIN, *Assistant Examiner.*